United States Patent Office.

WILLIAM R. LOOMIS, NELSON WELLS, HARMON HITCHCOCK, AND SAMUEL G. STRYKER, OF ELMIRA, NEW YORK.

Letters Patent No. 66,364, dated July 2, 1867.

IMPROVED BURNING-FLUID.

*The Schedule referred to in these Letters Patent and making part of the same.*

TO ALL WHOM IT MAY CONCERN:

Be it known that we, WILLIAM R. LOOMIS, NELSON WELLS, HARMON HITCHCOCK, and SAMUEL G. STRYKER, of the city of Elmira, county of Chemung, and State of New York, have invented a new and improved Method of Manufacturing a Burning-Fluid (crystallized oil) which is non-explosive, and which can be furnished at moderate rates; and we do hereby declare that the following is a full and exact description of our method of making the same.

The nature of our invention consists in making a burning-fluid which can be afforded at a cheaper rate than ordinary oil, which fluid is relieved from the offensive odors of the oil in use, will not soil delicate textures by contact, and is non-explosive. It is well known that the most serious results have followed accidents that occurred from the use of oil-lamps, and that when the oil becomes ignited it cannot be extinguished with ease.

To enable others skilled in the art to make and use our invention, we will proceed to a minute description of its manufacture.

We take a cask containing forty gallons of naphtha, of a specific gravity of say from 60 to 74, and in said quantity I put two pounds of alum, finely pulverized, two pounds of common salt, one pound of potash, four ounces of camphor gum, and half a pint of the spirits of nitre, when the same is ready for use, and which will be seen to produce a fine light, and to contain all the qualities we have mentioned. This fluid can be put upon paper and set on fire and the texture remain unharmed, or it can be ignited at the mouth of a glass lamp without the least danger of explosion. All the substances mentioned must be pulverized before they are put into the cask, and then they will be readily diffused through the whole of the naphtha. We have tested the fluid containing these ingredients, and have brought the same to its present perfection by repeated trials. We at one time put the potash in the cask in large lumps, and we found that the fluid could not be used with either comfort or safety. Upon examination we ascertained that the potash remained in the cask in nearly the same condition, and would not mingle with the fluid unless it was finely divided; and by repeated experiment we are well satisfied that the potash is one of the most essential elements which enters into this combination, and that the non-explosive character of our fluid is in a great degree dependent upon the presence of the same.

What we claim as our invention, and desire to procure by Letters Patent, is—

The manufacture for sale of a burning-fluid (crystallized oil) made by adding to forty gallons of naphtha, two pounds of alum, two pounds of common salt, one pound potash, and four ounces camphor gum, finely pulverized, and half a pint of spirits of nitre.

We also claim the use of potash when it is combined with substantially the substances mentioned, for the purpose of making a burning-fluid as described.

WM. R. LOOMIS,
HARMON HITCHCOCK,
NELSON WELLS,
SAML. G. STRYKER.

Witnesses:
A. T. HITCHCOCK,
WM. W. ALBRO.